US010815899B2

(12) United States Patent
Mitrovic et al.

(10) Patent No.: US 10,815,899 B2
(45) Date of Patent: Oct. 27, 2020

(54) GAS TURBINE ENGINE ACCESSORIES ARRANGEMENT (71) Applicant: PRATT & WHITNEY CANADA CORP., Longueuil (CA)

(72) Inventors: Lazar Mitrovic, Longueuil (CA); Jean Dubreuil, Boucherville (CA); Eric Durocher, Vercheres (CA); Keith Morgan, Westmount (CA); Michel Desjardins, St-Hubert (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 315 days.

(21) Appl. No.: 15/351,803

(22) Filed: Nov. 15, 2016

(65) Prior Publication Data

US 2018/0135522 A1 May 17, 2018

(51) Int. Cl.
F02C 7/36 (2006.01)
F02C 3/14 (2006.01)
F02C 7/32 (2006.01)
F02C 3/04 (2006.01)
F02C 7/04 (2006.01)

(52) U.S. Cl.
CPC .......... F02C 7/36 (2013.01); F02C 3/04 (2013.01); F02C 3/145 (2013.01); F02C 7/04 (2013.01); F02C 7/32 (2013.01); F05B 2220/302 (2013.01); F05B 2260/40311 (2013.01); F05D 2250/311 (2013.01); F05D 2250/313 (2013.01); F05D 2250/314 (2013.01); Y02T 50/671 (2013.01)

(58) Field of Classification Search
CPC .... F02C 7/36; F02C 3/10; F02C 3/107; F02C 3/145; F02C 7/32; F01D 25/18; F05D 2260/40311
See application file for complete search history.

(56) References Cited

U.S. PATENT DOCUMENTS

| 2,548,975 | A |   | 4/1951  | Hawthorne |           |
|-----------|---|---|---------|-----------|-----------|
| 2,747,367 | A |   | 5/1956  | Savin     |           |
| 2,929,207 | A |   | 3/1960  | Peterson  |           |
| 2,955,424 | A |   | 10/1960 | Hryniszak |           |
| 2,984,977 | A |   | 5/1961  | Embree    |           |
| 3,152,443 | A | * | 10/1964 | Newland   | B64D 35/00 |
|           |   |   |         |           | 60/791    |
| 3,170,292 | A |   | 2/1965  | Howes     |           |
| 3,204,406 | A |   | 9/1965  | Howes     |           |

(Continued)

FOREIGN PATENT DOCUMENTS

CA 2562290 C 10/2013
CA 2970386 1/2018

(Continued)

OTHER PUBLICATIONS

European Search Report dated Nov. 30, 2017 in counterpart EP application No. 17182102.8.

(Continued)

Primary Examiner — Carlos A Rivera
(74) Attorney, Agent, or Firm — Norton Rose Fulbright Canada LLP (57) ABSTRACT A gas turbine engine has an in-line mounted accessory gear box (AGB) and an accessory drivingly connected to the AGB, the accessory being oriented transversally to the engine centerline.

18 Claims, 3 Drawing Sheets

(56) References Cited

U.S. PATENT DOCUMENTS

| | | |
|---|---|---|
| 3,209,536 A | 10/1965 | Howes |
| 3,255,825 A | 6/1966 | Mouille et al. |
| 3,488,947 A | 1/1970 | Miller |
| 3,529,419 A * | 9/1970 | Reed .................. F02C 7/32 |
| | | 192/103 F |
| 3,762,161 A | 10/1973 | Pennig |
| 3,874,811 A | 4/1975 | Dennison |
| 4,055,949 A | 11/1977 | Boudigues |
| 4,141,212 A | 2/1979 | Koschier |
| 4,251,987 A | 2/1981 | Adamson |
| 4,498,291 A | 2/1985 | Jefferey |
| 4,531,694 A | 7/1985 | Soloy |
| 4,611,464 A | 9/1986 | Hetzer et al. |
| 4,685,286 A | 8/1987 | Hetzer et al. |
| 4,817,382 A | 4/1989 | Rudolph et al. |
| 4,864,812 A * | 9/1989 | Rodgers .................. F02C 3/055 |
| | | 60/39.091 |
| 5,159,808 A * | 11/1992 | Kast .................. F02C 7/236 |
| | | 60/39.091 |
| 5,161,364 A | 11/1992 | Bruun |
| 5,309,708 A * | 5/1994 | Stewart, Jr. .............. B64D 41/00 |
| | | 60/39.15 |
| 6,041,589 A | 3/2000 | Giffin, III et al. |
| 6,082,967 A | 7/2000 | Loisy |
| 6,247,668 B1 | 6/2001 | Reysa |
| 6,855,089 B2 * | 2/2005 | Poulin .................. F02C 7/36 |
| | | 475/331 |
| 6,865,891 B2 | 3/2005 | Walsh et al. |
| 6,895,741 B2 | 5/2005 | Rago et al. |
| 7,055,303 B2 | 6/2006 | Macfarlane et al. |
| 7,168,913 B2 | 1/2007 | Lardellier |
| 7,500,365 B2 | 3/2009 | Suciu et al. |
| 7,552,591 B2 | 6/2009 | Bart |
| 7,690,185 B2 | 4/2010 | Linet et al. |
| 7,707,909 B2 * | 5/2010 | Linet .................. F02C 7/36 |
| | | 74/720 |
| 7,762,084 B2 | 7/2010 | Martis |
| 8,176,725 B2 | 5/2012 | Norris |
| 8,209,952 B2 | 7/2012 | Ress, Jr. |
| 8,220,245 B1 | 7/2012 | Papandreas |
| 8,459,038 B1 | 6/2013 | Lickfold et al. |
| 8,516,789 B2 | 8/2013 | Kupratis |
| 8,568,089 B2 | 10/2013 | Lemmers, Jr. et al. |
| 8,621,871 B2 | 1/2014 | McCune et al. |
| 8,794,922 B2 | 8/2014 | Bart et al. |
| 8,853,878 B1 | 10/2014 | White |
| 9,062,611 B2 | 6/2015 | Sheridan |
| 9,126,691 B2 | 9/2015 | Cloft |
| 9,145,834 B2 | 9/2015 | Frost et al. |
| 9,239,004 B2 | 1/2016 | Kupratis |
| 9,322,341 B2 | 4/2016 | Belleville |
| 9,328,667 B2 | 5/2016 | MacFarlane |
| 9,341,121 B2 | 5/2016 | Kupratis |
| 9,353,848 B2 | 5/2016 | Blewett et al. |
| 9,512,784 B2 | 12/2016 | Morgan et al. |
| 9,828,911 B2 | 1/2017 | Burghardt |
| 9,719,465 B2 | 8/2017 | Suciu |
| 9,745,860 B1 | 8/2017 | Haskin |
| 9,752,500 B2 | 9/2017 | Ullyott |
| 9,784,182 B2 | 10/2017 | Dhanuka |
| 9,819,292 B2 | 11/2017 | Thatcher |
| 9,890,704 B2 | 2/2018 | Speak et al. |
| 9,926,849 B2 | 3/2018 | Frost et al. |
| 9,932,858 B2 | 4/2018 | Miller |
| 10,054,001 B2 | 8/2018 | Beutin et al. |
| 10,072,570 B2 | 9/2018 | Kupratis |
| 10,094,295 B2 | 10/2018 | Ullyott et al. |
| 10,125,722 B2 | 11/2018 | Kupratis |
| 2005/0060983 A1 | 3/2005 | Lardellier |
| 2006/0010152 A1 | 1/2006 | Catalano |
| 2006/0137355 A1 | 6/2006 | Welch et al. |
| 2007/0240427 A1 | 10/2007 | Ullyott |
| 2008/0081733 A1 | 4/2008 | Hattenbach |
| 2008/0138195 A1 | 6/2008 | Kern |
| 2008/0148881 A1 | 6/2008 | Moniz et al. |
| 2009/0015011 A1 | 1/2009 | Colin |
| 2009/0188334 A1 | 7/2009 | Merry |
| 2009/0288421 A1 | 11/2009 | Zeiner |
| 2009/0322088 A1 | 12/2009 | Dooley |
| 2010/0164234 A1 | 7/2010 | Bowman |
| 2010/0180568 A1 | 7/2010 | Sachs |
| 2010/0212285 A1 | 8/2010 | Negulescu |
| 2010/0281875 A1 | 11/2010 | Price |
| 2011/0056208 A1 | 3/2011 | Norris |
| 2011/0171030 A1 | 7/2011 | Swift |
| 2011/0284328 A1 | 11/2011 | Brandt |
| 2012/0117982 A1 * | 5/2012 | Suciu .................. F02C 7/32 |
| | | 60/802 |
| 2012/0317991 A1 | 12/2012 | Frost et al. |
| 2013/0031912 A1 | 2/2013 | Finney |
| 2013/0056982 A1 | 3/2013 | Gozdawa |
| 2013/0098066 A1 | 4/2013 | Gallet |
| 2013/0139518 A1 | 6/2013 | Morgan |
| 2013/0145769 A1 | 6/2013 | Norris |
| 2013/0186058 A1 | 7/2013 | Sheridan |
| 2013/0193688 A1 * | 8/2013 | Duong .................. F02C 7/36 |
| | | 290/47 |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0150401 A1 | 6/2014 | Venter |
| 2014/0250862 A1 | 9/2014 | Suciu et al. |
| 2014/0252160 A1 | 9/2014 | Suciu et al. |
| 2014/0255147 A1 | 9/2014 | Root |
| 2014/0256494 A1 | 9/2014 | Lewis |
| 2014/0260295 A1 | 9/2014 | Ullyott |
| 2014/0290265 A1 | 10/2014 | Ullyott |
| 2014/0297155 A1 | 10/2014 | Chen |
| 2015/0013307 A1 | 1/2015 | Burghardt |
| 2015/0150401 A1 | 6/2015 | Bennett |
| 2015/0167549 A1 | 6/2015 | Ribarov |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 * | 2/2016 | Frost .................. F02C 7/32 |
| | | 415/122.1 |
| 2016/0090871 A1 | 3/2016 | Olsen |
| 2016/0169118 A1 | 6/2016 | Duong |
| 2016/0178464 A1 * | 6/2016 | Burns .................. F01D 17/02 |
| | | 73/112.01 |
| 2016/0201490 A1 | 7/2016 | Scott |
| 2016/0208690 A1 | 7/2016 | Zimmitti |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0319845 A1 | 11/2016 | Molnar |
| 2016/0333791 A1 | 11/2016 | Snyder et al. |
| 2016/0341214 A1 | 11/2016 | O'Toole |
| 2017/0108084 A1 | 4/2017 | Chmylkowski |
| 2017/0122122 A1 | 5/2017 | Lepretre |
| 2017/0191413 A1 | 7/2017 | Knight |
| 2017/0211477 A1 | 7/2017 | Menheere |
| 2017/0211484 A1 | 7/2017 | Sheridan |
| 2017/0306841 A1 | 10/2017 | Skertic |
| 2017/0314469 A1 | 11/2017 | Roever |
| 2017/0314474 A1 * | 11/2017 | Wotzak .................. F02C 7/06 |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey |
| 2018/0016982 A1 * | 1/2018 | Wotzak .................. F01D 25/10 |
| 2018/0016989 A1 | 1/2018 | Abe |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0135522 A1 | 5/2018 | Mitrovic et al. |
| 2018/0149091 A1 | 5/2018 | Howell et al. |

(56) References Cited

U.S. PATENT DOCUMENTS

| | | |
|---|---|---|
| 2018/0163640 A1 | 6/2018 | Dubreuil et al. |
| 2018/0171815 A1 | 6/2018 | Suciu et al. |
| 2018/0172012 A1 | 6/2018 | Plante et al. |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0291818 A1* | 10/2018 | Suciu ................... F02C 7/32 |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2535544 A2 | 12/2012 |
| EP | 2728140 | 5/2014 |
| EP | 3043056 | 7/2016 |
| EP | 3135882 A1 | 3/2017 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

European Search Report dated Dec. 12, 2017 in related EP application No. 17182076.4.
European Search Report dated Dec. 12, 2017 in related EP application No. 17182096.2.
European Search Report dated Jan. 31, 2018 in related EP application No. 17185796.4.
European Search Report dated Mar. 19, 2018 in related EP application No. 17182087.1.
European Search Report dated Mar. 21, 2018 in related EP application No. 17182094.7.
European Search Report dated Apr. 6, 2018 in related EP application No. 17193893.9.
European Search Report dated Jul. 2, 2018 in relating EP application No. 18154161.6.
European Search Report dated May 25, 2018 in related EP application No. 17191309.8.
European Search Report dated May 25, 2018 in related EP application No. 17186249.3.
A New Approach to Turboshaft Engine Growth, M. A. Compagnon, General Electric Company, Lynn,Massachusetts pp. 80-41-1 to 80-41-6.
A New Approach to Turboshaft Engine Growth, M. A. Compagnon, General Electric Company, Lynn,Massachusetts pp. 80-41-1 to 80-41-6, May 13, 1980.

* cited by examiner

GAS TURBINE ENGINE ACCESSORIES ARRANGEMENT

TECHNICAL FIELD

The application relates generally to gas turbine engines and, more particularly, to accessories mounting arrangement.

BACKGROUND OF THE ART

Gas turbine engines which power aircraft are often provided with accessories such as electrical generators, pumps and the like, which are required for operation of the engine and an associated aircraft. It is common practice to mechanically connect such accessories to the engine by means of an accessory gearbox, which is itself mechanically connected to the rotational shaft of the engine. The accessories may be mounted either in parallel to the main engine shaft(s) or be mounted serially at one end, or a combination thereof. Accessories must also sometimes be removed and repaired or replaced, ideally without also removing the engine from within the aircraft. A need for improvement in engine accessories exists.

SUMMARY

In one aspect, there is provided a gas turbine engine comprising: an air inlet case for receiving air, a compressor, a combustor, a turbine having a shaft rotatable about a turbine shaft centerline, an accessory gear box (AGB) positioned adjacent an axial end of the air inlet case and driven by the turbine, and at least one engine accessory drivingly connected to the AGB and having an input shaft having an input axis which is disposed transverse to the turbine shaft.

In another aspect, there is provided a gas turbine engine comprising: an air inlet case for receiving air, a compressor rotatable about an engine centerline for pressurizing the air from the air inlet case, a combustor in which the air compressed by the compressor is mixed with fuel and ignited for generating a stream of combustion gases, a turbine rotatable about the engine centerline for extracting energy from the combustion gases, an accessory gear box (AGB) centered relative to the engine centerline upstream of the air inlet case, and accessories drivingly connected to the AGB, the accessories being oriented transversally to the engine centerline.

In yet another aspect, there is provided a gas turbine engine comprising an air inlet case for receiving air, a compressor rotatable about an engine centerline for pressurizing the air from the air inlet case, a combustor in which the air compressed by the compressor is mixed with fuel and ignited for generating a stream of combustion gases, a turbine rotatable about the engine centerline for extracting energy from the combustion gases, an accessory gear box (AGB) mounted in-line with the engine centerline, and at least one accessory drivingly connected to the AGB, the at least one accessory being oriented transversally to the engine centerline.

DESCRIPTION OF THE DRAWINGS

Reference is now made to the accompanying figures in which.

DETAILED DESCRIPTION

Figure 1:
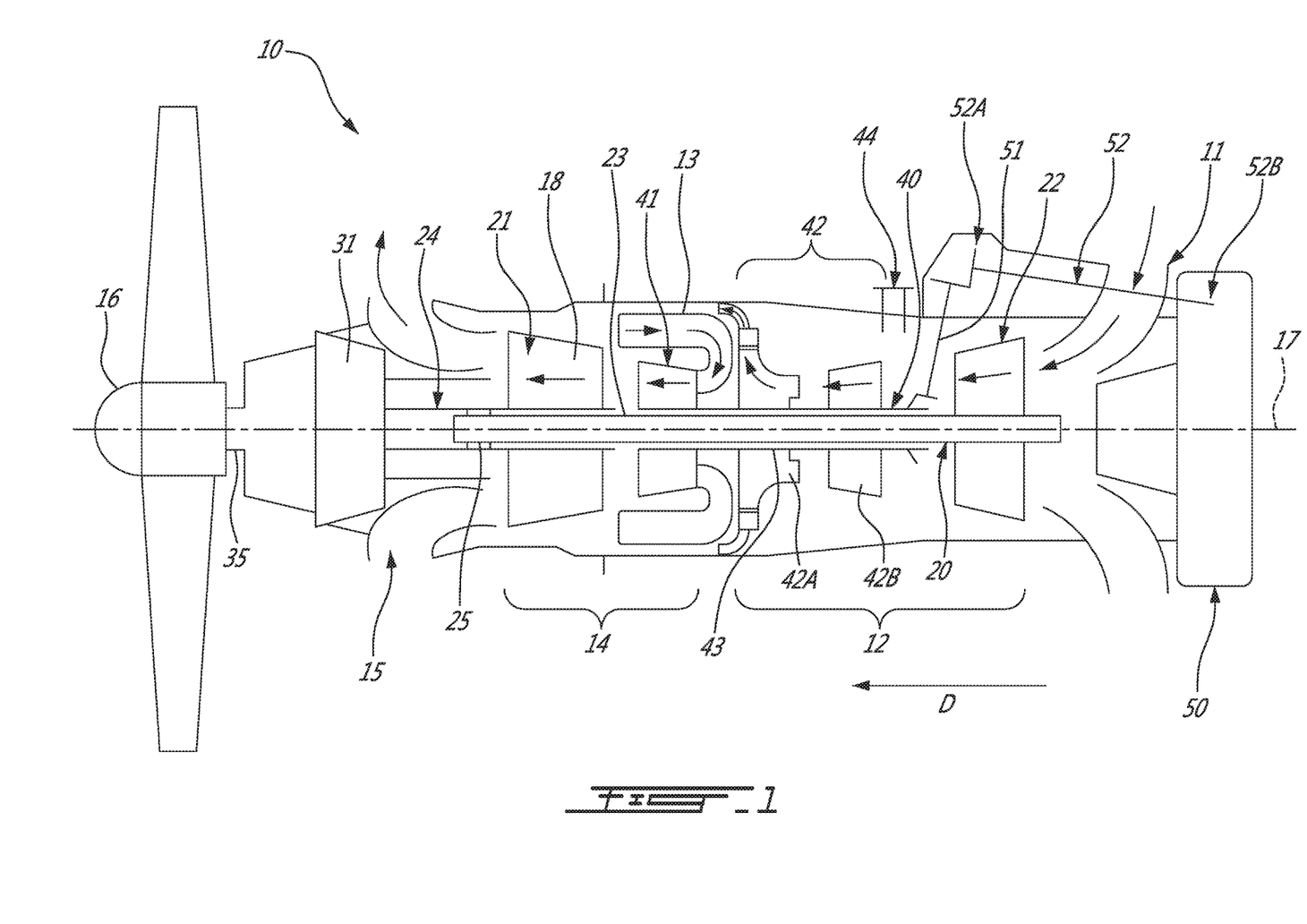
FIG. 1 is a schematic cross-sectional view of a gas turbine engine, according to an embodiment of the present disclosure.

FIG. 1 illustrates a gas turbine engine 10 of a type preferably provided for use in subsonic flight, generally comprising in serial flow communication an air inlet case 11, a compressor section 12 for pressurizing the air from the air inlet case 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis or centerline 17.

The gas turbine engine 10 (sometimes referred to herein simply as "engine 10") has a central core 18 defining a gas path through which gases flow as depicted by flow arrows in FIG. 1. The exemplified engine 10 is a "reverse-flow" engine 10 because gases flow through the core 18 from the air inlet case 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the core 18 of the engine 10 disclosed herein can be better appreciated by considering that the gases flow through the core 18 in the same direction D as the one along which the engine 10 travels during flight. Stated differently, gases flow through the engine 10 from a rear end thereof towards the propeller 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the exemplified engine 10 has multiple spools which perform compression to pressurize the air received through the air inlet case 11, and which extract energy from the combustion gases before they exit the core 18 via the exhaust outlet 15. According to the illustrated example, the engine 10 is provided in the form of a multi-spool engine having a low pressure (LP) spool 20 and a high pressure (HP) spool 40 independently rotatable about axis 17. However, it is understood that a multi-spool engine could have more than two spools.

The LP spool 20 includes at least one component to compress the air that is part of the compressor section 12, and at least one component to extract energy from the combustion gases that is part of the turbine section 14. More particularly, the LP spool 20 has a low pressure turbine 21 which extracts energy from the combustion gases, and which is drivingly engaged (e.g. directly connected) to an LP compressor 22 for pressurizing the air. The LP turbine 21 (also referred to as the power turbine) drives the LP compressor 22, thereby causing the LP compressor 22 to pressurize the air. Both the LP turbine 21 and the LP compressor 22 are disposed along the axis 17. In the depicted embodiment, both the LP turbine 21 and the LP compressor 22 are axial rotatable components having an axis of rotation that is coaxial with the center axis 17. They can include one or more stages, depending upon the desired engine thermodynamic cycle, for example.

In the depicted embodiment, the LP spool 20 has a power shaft 23 which mechanically couples the LP turbine 21 and the LP compressor 22, and extends axially between them. The shaft 23 is coaxial with the central axis 17 of the engine 10. The shaft 23 allows the LP turbine 21 to drive the LP compressor 22 during operation of the engine 10. The shaft 23 is not limited to the configuration depicted in FIG. 1, and can also mechanically couple the LP turbine 21 and the LP compressor 22 in any other suitable way provided that it transmits a rotational drive from the LP turbine 21 to the LP compressor 22. For example, the shaft 23 can be combined with a geared LP compressor 22 to allow the LP compressor 22 to run at a different rotational speed from the LP turbine 21. This can provide more flexibility in the selection of design points for the LP compressor.

The LP turbine 21 is forward of the LP compressor 22. The LP turbine 21 is also aft of the exhaust outlet 15. The LP compressor 22 is forward of the air inlet case 11. This arrangement of the LP turbine 21 and the LP compressor 22 provides for a reverse-flow engine 10 that has one or more LP compressors located at the rear of the engine 10, which are driven by one or more LP turbines located at the front of the engine 10.

Still referring to FIG. 1, the engine 10 includes an output drive shaft 24. The drive shaft 24 extends forwardly from the LP turbine 21 and is drivingly engaged thereto. In the illustrated example, the drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23, 24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other mechanical techniques can also be used to interconnect the power and drive shafts 23, 24. For example, the power and drive shafts 23, 24 can be interconnected by curvic coupling, pins, and interference fits. Other configurations of the drive shaft 24 and the power shaft 23 are also possible. For example, the drive shaft 24 and the power shaft 23 can be a single shaft driven by the LP turbine 21. The drive shaft 24 therefore transfers the rotational output of the LP turbine 21 in a forward direction to drive another component.

A rotatable load, which in the embodiment shown includes the propeller 16, is mountable to the engine 10, and when mounted, is drivingly engaged (e.g. directly connected) to the LP turbine 21, and is located forward of the LP turbine 21. In such a configuration, during operation of the engine 10, the LP turbine 21 drives the rotatable load such that a rotational drive produced by the LP turbine 21 is transferred to the rotatable load. The rotatable load can therefore be any suitable component, or any combination of suitable components, that is capable of receiving the rotational drive from the LP turbine 21, as now described.

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through known gear reduction techniques. The RGB 31 allows for the propeller 16 to be driven at its optimal rotational speed, which is different from the rotational speed of the LP turbine 21.

The propeller 16 is mechanically coupled to the output of the RGB 31 via a propeller shaft 35. The propeller shaft 35 allows the rotational drive outputted by the RGB 31 during operation of the engine 10 to be transferred to the propeller 16 to provide propulsion during flight. In an alternate embodiment where the engine 10 is a turboshaft, the propeller 16 is omitted and the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the propeller 16 and RGB 31 are omitted such that the output of the engine 10 is provided by the output drive shaft 24.

The drive shaft 24 extending forward of the LP turbine 21 and the power shaft 23 extending aft of the LP turbine 21 provide the engine 10 with bidirectional drive. Modularity criteria for gas turbine engines may require the use of distinct shafts 23, 24 that are directly or indirectly connected together. Alternately, the power shaft 23 and the drive shaft 24 can be integral with one another, with a first segment of the integral output shaft extending between the LP compressor 22 and the LP turbine 21, and a second segment extending between the rotatable load and the LP turbine 21. Whether the power shaft 23 is integral with the drive shaft 24 or distinct therefrom, the LP turbine 21 provides rotational drive outputted at each end of the power shaft 23.

In light of the preceding, it can be appreciated that the LP turbine 21 drives both the rotatable load and the LP compressor 22. Furthermore, the rotatable load, when mounted to the engine 10 and the LP compressor 22 are disposed axially on opposite ends of the LP turbine 21. It can thus be appreciated that one or more low pressure turbines are used to drive elements in front of the low pressure turbines (e.g. propeller 16, RGB 31, etc.) as well as to drive elements to the rear of the low pressure turbines (e.g. LP compressor 22). This configuration of the LP turbine 21 allows it to simultaneously drive the rotatable load and the LP compressor 22, if desired. As will be discussed in greater detail below, this arrangement of the rotatable load, the LP turbine 21, and the LP compressor 22 can contribute to improving the thermodynamic efficiency of the engine 10.

Still referring to FIG. 1, the HP spool 40 with at least one component to compress the air that is part of the compressor section 12, and at least one component to extract energy from the combustion gases that is part of the turbine section 14. The HP spool 40 is also disposed along the axis 17 and includes an HP turbine 41 drivingly engaged (e.g. directly connected) to a high pressure compressor 42 by an HP shaft 43 rotating independently of the power shaft 23. Similarly to the LP turbine 21 and the LP compressor 22, the HP turbine 41 and the HP compressor 42 can include various stages of axial rotary components. In the depicted embodiment, the HP compressor 42 includes a centrifugal compressor 42A or impeller and an axial compressor 42B, both of which are driven by the HP turbine 41. During operation of the engine 10, the HP turbine 41 drives the HP compressor 42.

The HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine when compared to the HP turbine 41. The LP turbine 21 is sometimes referred to as a "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22. The engine 10 shown in FIG. 1 is thus a "two-spool" engine 10.

The HP turbine 41 and the HP compressor 42 can have any suitable mechanical arrangement to achieve the above-described split compressor functionality. For example, and as shown in FIG. 1, the HP spool 40 includes a high pressure shaft 43 extending between the HP compressor 42 and the HP turbine section 41. The high pressure shaft 43 is coaxial with the power shaft 23 and rotatable relative thereto. The relative rotation between the high pressure shaft 43 and the power shaft 23 allow the shafts 23, 43 to rotate at different rotational speeds, thereby allowing the HP compressor 42 and the LP compressor 22 to rotate at different rotational speeds. The HP shaft 43 can be mechanically supported by the power shaft 23 using bearings or the like or the two shafts can be independently supported from one another. In the depicted embodiment, the power shaft 23 is at least partially disposed within the HP shaft 43.

The split compressor arrangement also allows bleed air to be drawn from between the HP compressor 42 and the LP compressor 22. More particularly, in the embodiment of FIG. 1, the engine 10 includes an inter-stage bleed 44 port or valve that is aft of the HP compressor 42 and forward of the LP compressor 22, which may provide for increased flexibility in the available bleed pressures. In a particular embodiment, the bleed pressure design point of the inter-stage bleed 44 is selected based on the pressure ratio of the LP compressor 22, which runs independently from the HP compressor 42. For operability, variable inlet guide vanes (VIGV) and variable guide vanes (VGV) can be used on the LP compressor 22 and at the entry of the HP compressor 42, together with the inter-stage bleed 44.

Still referring to the embodiment shown in FIG. 1, the engine 10 also includes an accessory gearbox (AGB) 50. The AGB 50 receives a rotational output and in turn drives at least one accessory and typically a plurality of accessories, such as fuel pump, starter-generator, oil pump, scavenge pump, etc. that contribute to the functionality of the engine 10 and/or the aircraft.

The AGB 50 is mounted in-line with the LP spool and the HP pressure spool on an axially facing surface of the air inlet case 11. According to the embodiment illustrated in FIG. 1, the AGB 50 is mounted centrally relative to the engine centerline 17. As can be best appreciated from FIG. 2, by axially mounting the AGB 50 in series with the LP and HP spools 20 and 40 instead of side-mounting the AGB, the AGB 50 may be substantially accommodated with the engine envelope as schematically represented by circle C in FIG. 2. In this way, the engine 10 can be packaged as a "straighter cylinder" engine, which may be advantageous in some aircraft installations. The in-line or axial mounting of the AGB allows minimizing the diameter of the engine envelope. It also allows to simplify the design of the AGB (cost, weight) compared to conventional side-mounted AGBs.

It is understood that the in-line mounting of the AGB 50 is not strictly limited to a coaxial or centralized mounting of the AGB 50 as shown in FIG. 1. For instance, the engine centerline 17 could extend through the AGB 50 but be offset from the center thereof. The AGB 50 would nevertheless be located axially upstream of the air inlet case 11 at the end of the engine.

According to the illustrated embodiment, the AGB 50 is drivingly connected to the HP spool 40. To get around the LP compressor 22, which is physically disposed between the HP compressor and the AGB, an HP offset drive may be used. The HP offset drive may include a tower shaft 51 that is mechanically coupled to a rear of the HP shaft 43 and driven thereby. The tower shaft extends from the HP spool 40 in a direction away from the engine axis 17 for connection with an accessory gear box drive shaft 52 having a first geared end 52A mechanically coupled to the tower shaft 51, and a second geared end 52B mechanically coupled to the AGB 50. As can be appreciated from FIG. 1, the AGB drive shaft 52 has a main axial component parallel to the engine axis 17 to bridging the tower shaft to the AGB 50.

In the depicted embodiment, the accessory gearbox drive shaft 52 extends across the air inlet case 11. This configuration of the accessory gearbox drive shaft 52 can take different forms. For example, it can be located outside the air inlet case 11, or may be placed within the air inlet case 11 along a strut of the air inlet case 11. It can thus be appreciated that the second end 52B of the accessory gearbox drive shaft 52 meshes with an input gear of the AGB 50 to drive the AGB 50 across the air inlet case 11.

Figure 2:
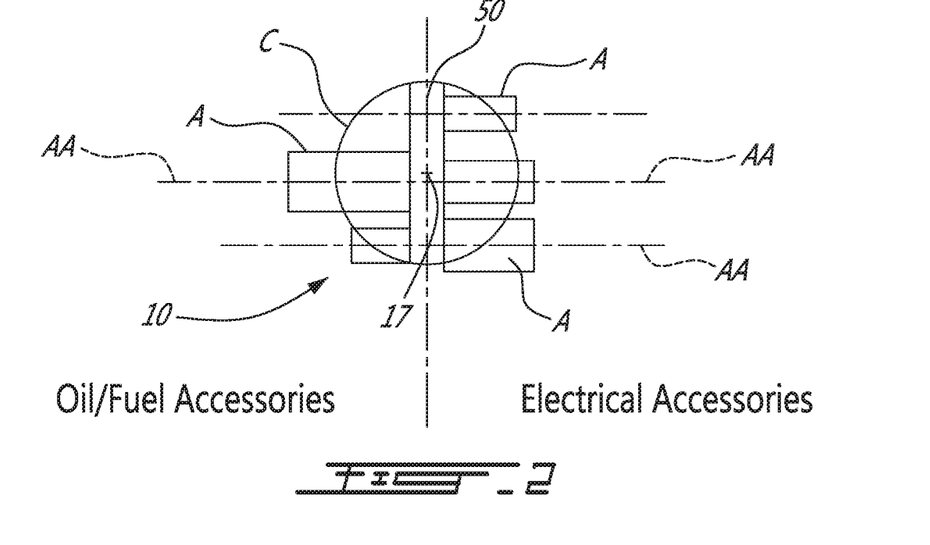
FIG. 2 is a schematic rear end view of the engine shown in FIG. 1 illustrating accessories side-mounted to an axially mounted accessory gearbox (AGB) of the engine.

During operation of the engine 10, the high pressure shaft 43 transmits a rotational drive to the tower shaft 51, which, in turn, drives the accessory gearbox drive shaft 52 to thereby drive the accessories A (FIG. 2) connected to the AGB outputs. As shown in FIG. 2, the accessories A extend laterally from the AGB 50 with their respective input axes AA transversal to the engine centerline 17. In the illustrated embodiment, the input axes AA are perpendicular to the engine centerline 17. The side-mounting of the accessories A on the in-line mounted AGB 50 facilitates access to the accessories A during on-wing maintenance operations. It also contributes to reducing the engine overall length. It may also simplify cooling line routing for some accessories, such as the starter and the generator (accessories closer to engine cowling).

As shown in FIG. 2, for flight safety and airworthiness considerations, the oil/fuel accessories can be grouped on a first side of the engine central plane while the electrical accessories are grouped on a second opposite side of the engine central plane. So isolating the electric components from the flammable fluid components may provide added safety.

Figure 3:
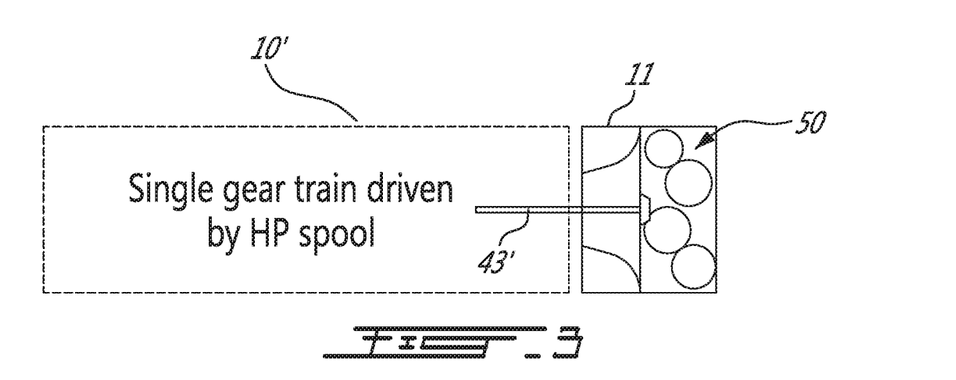
FIG. 3 is a schematic cross-sectional view of a gas turbine engine having single gear train AGB driven by a high pressure (HP) spool.

As shown in FIG. 3, the AGB 50 may have a drive input coaxial to the engine centerline 17. According to this embodiment, the HP spool shaft 43 may be extended centrally through the air inlet case 11 internally from the annular air path defined by the inlet case 11 in order to provide an internal drive input to the AGB. 50. This eliminates the needs for a tower shaft arrangement as shown in FIG. 1. The HP shaft becomes the AGB input shaft 43. The engine 10' may include a single spool or multiple spools. The engine 10 may be a straight flow engine or a reverse flow engine. In fact, various core engine configurations are contemplated. The accessories can be side-mounted to the AGB 50 as for instance shown in FIGS. 2 and 6.

Figure 4:
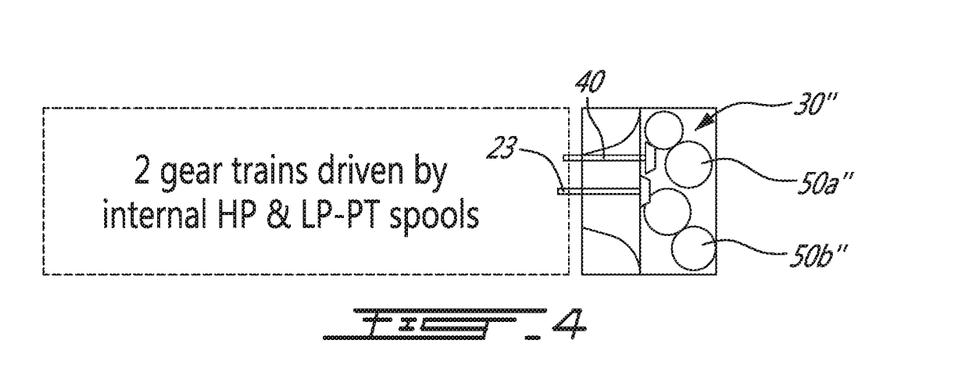
FIG. 4 is a schematic cross-sectional view of a gas turbine engine having an AGB including a dual gear train with a first drive input from the HP spool and a second drive input from a low pressure (LP) spool.
Figure 5:
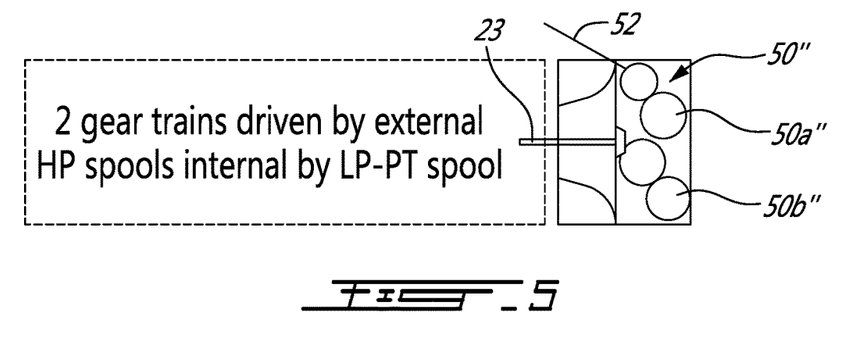
FIG. 5 is a schematic cross-sectional view of a gas turbine engine having an AGB including a dual gear train having a first drive input from the HP spool from an external drive connection and a second drive input from the LP spool centrally along the engine centerline.

As shown in FIGS. 4 and 5, the AGB 50" may have more than one drive input. For instance, in addition to the drive input provided by the HP spool 40 via the tower shaft 51 and the AGB drive shaft 52 (FIG. 1), the power or LP shaft 23 could be extended axially through the air inlet case 11 to provide a second drive input to the AGB 50". The provision of a second driving source for the AGB allows reducing the load on the HP spool 40. Indeed, the load required to drive the AGB 50" could be shared by both the LP and the HP spools 20, 40. The HP spool 40 and the LP spool 20 can be used to jointly drive a single gear train or to provide independent drive to individual gear trains of a multi-gear train arrangement.

For instance, according to the embodiment shown in FIGS. 4 and 5, the AGB 50" is a dual gear train comprising first and second gear trains 50a" and 50b". The first gear train 50a" is drivingly connected to the HP spool 40. The second gear train 50b" is drivingly connected to the LP spool 20 via the LP shaft 23. As shown in FIG. 5, a tower shaft and an AGB input shaft arrangement similar to the one shown in FIG. 1 can be used to drivingly connect the first gear train 50a" to the HP spool 40, while the LP shaft 23 provides a second drive input along the engine centerline 17 to the second gear train of the AGB 50". As shown in FIG. 4, both the drive input from the HP and LP spools could be done internally from the annular air path defined by the air inlet case 11. According to this arrangement both drive inputs to the AGB 50" are parallel to the engine centerline 17.

Figure 6:
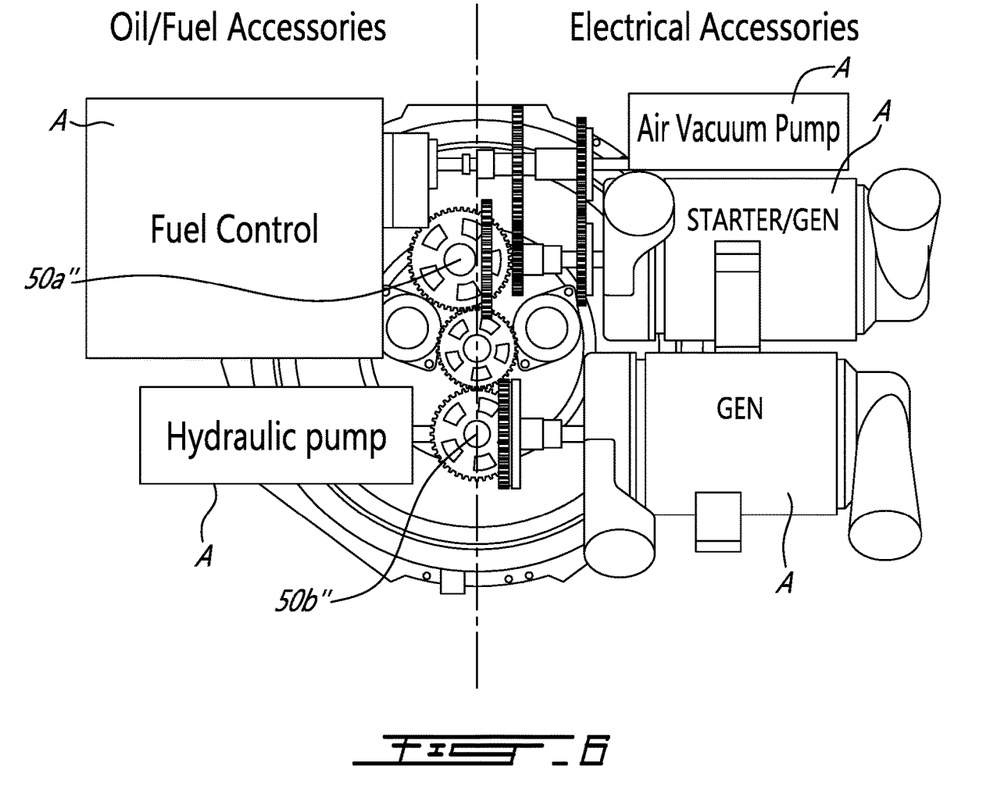
FIG. 6 is an end view of the engine shown in FIG. 4 and illustrating the oil/fuel accessories grouped together on a first side of the AGB and the electrical accessories grouped together on a side opposite side of the AGB, both groups of accessories being oriented perpendicularly to the engine centerline.

Referring to FIG. 6, it can be appreciated that the first and second gear trains 50a" and 50b" can be respectively drivingly connected to first and second groups of accessories A. For instance, the first gear train 50a", which is driven by the HP spool 40, may be drivingly connected to the main accessories, such as the starter, the fuel control unit, and the oil pump. The second gear train 50b", which is driven by the LP spool 20, may be drivingly connected to secondary accessories, such as a hydraulic oil pump and an electric generator. The first and second gear trains 50a", 50b" are provided with an output connection for the associated accessories. Based on the exemplary gear arrangement shown in FIG. 6, it can be appreciated that the input axes of the accessories A are perpendicular to the output axes of the AGB 50". It is however understood that the accessories could be otherwise transversally oriented relative to the engine axis 15 (i.e. they are not limited to be at 90 degrees to the engine axis, other angles being contemplated as well). Also, the accessories could extend at various angle to the vertical axis illustrated in FIG. 6 and are thus not limited to the illustrated exemplary perpendicular orientation. The accessories could be "clocked" around the engine envelope.

The above description is meant to be exemplary only, and one skilled in the art will recognize that changes may be made to the embodiments described without departing from the scope of the invention disclosed. For instance, while some aspects of the present invention have been described in the context of a reverse flow engine, it is understood that they are equally applicable to straight flow engines and to various types of gas turbine engines, including turboprop, turboshaft and turbofan engines. For instance, the AGB could be mounted in-line at the front of the engine. It is also understood that not all of the accessories need to have the same orientation. For instance, some accessories could be perpendicular to the engine axis while others are parallel thereto. Other modifications which fall within the scope of the present invention will be apparent to those skilled in the art, in light of a review of this disclosure, and such modifications are intended to fall within the appended claims.

The invention claimed is:

1. An aircraft engine comprising: an air inlet case for receiving air, a compressor, a combustor, a turbine and an accessory gear box (AGB) axially stacked along an engine centerline, the AGB positioned adjacent an axial end of the air inlet case and driven by the turbine, the aircraft engine further comprising a first engine accessory and a second engine accessory drivingly connected to the AGB and having respective input shafts disposed transverse to the engine centerline, wherein the AGB has a front face normal to the engine centerline and a top side, a bottom side, a left side and a right side extending axially from the front face, wherein the first engine accessory and the second engine accessory extend laterally from the left side or the right side of the AGB in a direction away from the left side or the right side, and wherein the first engine accessory and the second engine accessory are vertically offset relative to one another.

2. The engine defined in claim 1, wherein the input shafts of the first engine accessory and the second engine accessory are perpendicular to the engine centerline and vertically spaced-apart.

3. The engine defined in claim 1, wherein the AGB has an input axis parallel to the engine centerline.

4. The engine defined in claim 3, wherein the input axis of the AGB is coaxial to the engine centerline.

5. The engine defined in claim 4, wherein the AGB has a drive input shaft extending centrally through the air inlet case.

6. The engine defined in claim 5, wherein the drive input shaft of the AGB is drivingly connected to a high pressure spool.

7. The engine defined in claim 1, wherein the gas turbine engine has a low pressure (LP) spool and a high pressure (HP) spool, and wherein the LP spool and the HP spool are both drivingly connected to the AGB.

8. The engine defined in claim 7, wherein the AGB comprises a first gear train and a second gear train, the first gear train being drivingly connected to the HP spool, the second gear train being drivingly connected to the LP spool, and wherein the first engine accessory forms part of a first group of accessories and the second engine accessory forms part of a second group of accessories, the first group of accessories and the second group of accessories being respectively drivingly connected to the first and second gear trains of the AGB.

9. The engine defined in claim 8, wherein the first gear train has a first input shaft, the second gear train has a second input shaft, the first and second input shafts being parallel to the turbine shaft centerline and extending internally through a central bore of the air inlet case.

10. The engine defined in claim 8, wherein the first gear train has a first input shaft, the second gear train has a second input shaft, the first input shaft being drivingly connected to the HP spool via a tower shaft, the second input shaft being connected to the LP spool centrally through the air inlet case.

11. The engine defined in claim 8, wherein the first group of accessories comprises at least one of: a starter, a fuel control unit and an oil pump; and wherein the second group of accessories comprises at least one of: an air vacuum pump and an electric generator.

12. An aircraft engine comprising: an air inlet case for receiving air, a compressor rotatable about an engine centerline for pressurizing the air from the air inlet case, a combustor in which the air compressed by the compressor is mixed with fuel and ignited for generating a stream of combustion gases, a turbine rotatable about the engine centerline for extracting energy from the combustion gases, an accessory gear box (AGB) axially stacked along the engine centerline upstream of the air inlet case relative to a flow of air through the air inlet case, and accessories drivingly connected to the AGB, the accessories being oriented transversally to the engine centerline, the AGB having a front face normal to the engine centerline and a top side, a bottom side, a left side and a right side extending axially from the front face, the accessories extending laterally outwardly relative to the left side and the right side of the AGB, wherein the accessories include at least two vertically spaced-apart accessories.

13. The aircraft engine defined in claim 12, wherein the accessories have respective input axes perpendicular to the engine centerline.

14. The aircraft engine defined in claim 12, wherein the AGB is mounted to an axially facing surface of the air inlet case.

15. The aircraft engine defined in claim 12, wherein the accessories comprise oil/fuel accessories and electrical accessories, the oil/fuel accessories being grouped together on a first side of a central plane of the engine, the electrical accessories being grouped together one a second side of the central plane of the engine.

16. A gas turbine engine comprising an air inlet case for receiving air, a compressor rotatable about an engine centerline for pressurizing the air from the air inlet case, a combustor in which the air compressed by the compressor is mixed with fuel and ignited for generating a stream of combustion gases, a turbine rotatable about the engine centerline for extracting energy from the combustion gases, an accessory gear box (AGB) mounted in-line with the engine centerline, the AGB having a front face normal to the engine centerline and a top side, a bottom side, a left side and a right side extending axially from the front face, and a first accessory and a second accessory drivingly connected to the AGB, the first accessory and the second accessory being oriented transversally to the engine centerline and mounted on the left side or the right side of the AGB, the first accessory and the second accessory being vertically offset from one another.

17. The gas turbine engine defined in claim 16, wherein the AGB has an input axis coaxial to the engine centerline.

18. The gas turbine engine defined in claim 16, wherein the first accessory and the second accessory have respective input axes perpendicular to an associated output axis of the AGB.

* * * * *